United States Patent Office 3,249,420
Patented May 3, 1966

3,249,420
METHOD OF CONTROLLING PLANT GROWTH
Klaus Sasse, Cologne-Stammheim, Richard Wegler, Leverkusen, Engelbert Kühle and Ludwig Eue, Cologne-Stammheim, and Helmuth Hack, Leverkusen, Germany, assignors to Farbenfabriken Bayer Aktiengesellschaft, Leverkusen, Germany, a German corporation
No Drawing. Filed July 30, 1963, Ser. No. 298,587
Claims priority, application Germany, Aug. 16, 1962, F 37,591
7 Claims. (Cl. 71—2.5)

The present invention concerns the use of known 2,3-dimercapto-quinoxaline derivatives as agents for influencing plant growth.

It is an object of the invention to provide novel agents for influencing plant growth. A further object consists in the provision of novel herbicides. Finally, another object of the invention relates to the provision of those herbicidal agents which can be employed prior to emergence as well as after the emergence of cultivation. Further objects are evident from the following description and from the examples.

It has been found that the known 2,3-dimercapto-quinoxaline derivatives of the formula

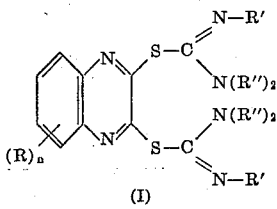

(I)

wherein

R denotes hydrogen, alkyl, alkoxy, nitro, and/or halogen,
$n$ denotes an integer of 1 to 4,
R' denotes an optionally substituted aromatic radical, and
R" denotes a lower alkyl radical, or
$(R'')_2N$— denotes the piperidyl or the morpholyl radical, exhibit properties which strongly influence plant growth.

It must be regarded as distinctly surprising that the quinoxaline derivatives to be employed according to the invention should possess properties which influence plant growth since it had not previously been known that quinoxaline derivatives have any properties of this kind. The agents for influencing plant growth according to the invention thus constitute a considerable valuable addition to technology.

The 2,3-dimercapto-quinoxaline derivatives to be employed are clearly characterised by the above mentioned Formula I. In this formula, R preferably represents hydrogen, alkyl with 1–4 carbon atoms, alkoxy with 1–4 carbon atoms, nitro, chlorine, and bromine. R' preferably represents phenyl optionally substituted by halogen and/or alkoxy with 1–4 carbon atoms. R" preferably represents alkyl with 1–4 carbon atoms, or $(R'')_2N$— represents the piperidyl or the morpholyl radical.

The compounds to be employed according to the invention are known and can be prepared by the simple method of reacting 2,3-dimercapto-quinoxalines with imidohalides (cf. Belgian patent specification No. 612,972).

The compounds according to the invention influence plant growth and may therefore be employed as defoliants, desiccants, herbicides, germination inhibitors, and particularly as weed killers. The term "weed" in its widest sense applies to all plants which grow in locations where they are not desired. The effect of the compounds according to the invention as total or selective herbicides depends mainly on the applied amount.

The compounds according to the invention may for instance be applied to the following plants: dicotyledons such as mustard (Sinapis), cress (Lepidium), goose grass (Galium), chickweed (Stellaria), camomile (Matricaria), gallant soldier (Galinsoga), goose foot (Chenopodium), stinging nettel (Urtica), groundsel (Senecio), cotton (Gossypium), beet (Beta), carrots (Daucus), beans (Phaseolus), potatoes (Solanium), coffee (Coffea); and monocotyledons such as timothy grass (Phleum), meadow grass (Poa), fescue grass (Festuca), Eleusine (Eleusine), Setaria, rye grass (Lolium), brome grass (Bromus), chick millet (Echinochloa), maize (Zea), rice (Oryza), oats (Avena), barley (Hordeum), wheat (Triticum), millet (Panicum), and sugar cane (Saccharum).

The varieties of plants cited in this list are to be regarded as representative examples for the families denoted by their Latin names. However, the application of the compounds according to the invention is by no means limited to these families and equally extends to other plants as well.

The 2,3-dimercapto-quinoxaline derivatives to be employed according to the invention are particularly characterised by a selective herbicidal activity. Thus, for instance, it is possible to use them for destroying the undesirable weeds in cultivated plants such as rice, cotton, beet, and cereals, wheat for example.

The compounds according to the invention may be employed by themselves or in the form of the usual compositions, such as emulsifiable concentrates, spray powders, pastes, soluble powders, dusting agents, and granulates. These are prepared in known manner (cf. Agricultural Chemicals, March 1960, pages 35–38). The following are chiefly suitable as assistants for this purpose: solvents such as aromatic hydrocarbons (for instance xylene, benzene), chlorinated aromatic hydrocarbons (for instance chlorobenzenes), paraffins (for instance petroleum fractions), alcohols (for instance methanol, butanol), amines (for instance ethanolamine, dimethylformamide), and water; carriers such as ground natural minerals (for instance kaolins, aluminas, talc, chalk) and ground synthetic minerals (for instance finely dispersed silica, silicates); emulsifying agents such as non-ionic and anionic emulsifiers (for instance polyhydroxyethylene esters of fatty acids, polyhydroxyethylene ethers of aliphatic alcohols, alkyl sulphonates, and aryl sulphonates); and dispersing agents such as lignin, spent sulphite liquors, and methylcellulose.

The active agents according to the invention may be present in the compositions in the form of mixtures with other known active agents.

In general, the compositions contain between 0.1 and 95 percent by weight of the active agent, preferably between 0.5 and 90 percent.

The compounds to be employed according to the invention or their compositions are employed by the usual methods, for instance by watering, spraying, atomising, scattering, or dusting. Their aplication can be carried out prior to or also after the emergence of the cultivated plants.

The following examples are given for the purpose of illustrating the invention:

*Example 1*

Various types of plants are treated in a greenhouse with compositions containing different concentrations of the compound of the following formula

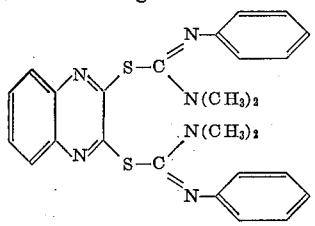

For this purpose, a 80% wettable powder dispersion in water is prepared at first, and the plants are subsequently sprayed with it according to the post-emergence method. Evaluation is carried out 14 days after spraying. The experimental results obtained are listed below:

| Experimental plant | Herbicidal effect at a concentration of the active agent of— | | |
|---|---|---|---|
| | 0.4% | 0.2% | 0.1% |
| Panicum crus galli | 5 | 5 | 4 |
| Avena fatua | 3 | 2-3 | 2 |
| Chenopodium album | 5 | 5 | 4-5 |
| Sinapis arvensis | 5 | 5 | 5 |
| Stellaria media | 5 | 4-5 | 3-4 |
| Portulacca oleracea | 5 | 4-5 | 4-5 |
| Galinsoga parviflora | 5 | 4 | 4 |
| Oryza sativa | 1 | 0-1 | 0 |
| Gossypium herbaceum | 1 | 0 | 0 |
| Phaseolus vulgaris | 5 | 2 | 1 |
| Triticum aestivum | 0 | 0 | 0 |

The above notation signifies: 5=total destruction of plants, 0=no effect.

The experiment results just given shown that the above mentioned compound constitutes an excellent weed control agent and that it can be employed as a selective or total herbicide, depending on the selected concentration of the active agent.

*Example 2*

Seed dishes are sown in a greenhouse with various cultivated plants and weeds. Aqueous dispersions of the active agent with the formula specified in Example 1 are poured into the dishes 24 hours after sowing, the rates of employed material to be applied in each case having been expressed as kg. of substance/hectare of ground area. The subsequent evaluation is carried out 3 weeks after sowing. The following experimental results are thus obtained:

| Experimental plant | Herbicidal effect at a concentration of active agent, in kg./hectare, of— | | | |
|---|---|---|---|---|
| | 40 | 20 | 10 | 5 |
| Panicum crus galli | 5 | 5 | 4-5 | 3-4 |
| Avena fatua | 4-5 | 4 | 4 | 2 |
| Sinapis arvensis | 5 | 5 | 5 | 4-5 |
| Beta vulgaris | 5 | 3 | 0 | 0 |
| Portulacca oleracea | 5 | 5 | 4-5 | 4 |
| Triticum aestivum | 4 | 4 | 3 | 1 |
| Gossypium herbaceum | 3 | 2 | 0 | 0 |
| Capsella bursa pastoris | 5 | 5 | 5 | 4-5 |
| Stellaria media | 5 | 5 | 5 | 5 |
| Gallinsoga parviflora | 5 | 5 | 5 | 5 |

The above notation signifies:
5=plants did not emerge or died after emergence.
0=normal plant development.

An application of the compound under consideration as a selective herbicide by the pre-emergence method is also possible.

*Example 3*

Several types of plants were sprayed in a greenhouse with 0.4% spray liquids containing different active agents, according to the post-emergence method. The state of the plants was checked after 14 days. The following results were obtained by the use of an evaluation scale of 0=uninhibited growth to 5=plant dead.

| Active agent | Herbicidal effect on— | | | | | | | |
|---|---|---|---|---|---|---|---|---|
| | Millet | Beet | Oats | Cotton | Wheat | Mustard | Tomatoes | Beans |
| 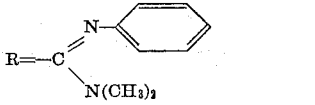 $R=-C\begin{subarray}{l}N-\phi\\ N(CH_3)_2\end{subarray}$ | | | | | | | | |
| 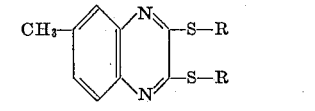 | 4 | 2 | 4 | 1 | 0 | 5 | 2 | 3 |
| 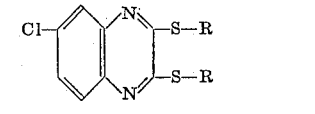 | 4 | 3 | 4 | 2 | 0 | 5 | 2 | 2 |
| 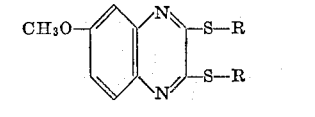 | 5 | 5 | 4 | 3 | 2 | 5 | 4 | 5 |
| 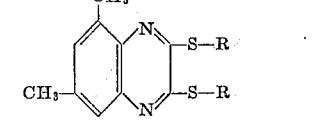 | 5 | 5 | 4-5 | 2 | 0 | 5 | 4 | 3 |
| 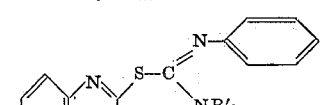 | | | | | | | | |
| R'=C_2H_5 | 2 | 2 | 3 | 0 | 0 | 5 | 0 | 1 |
| R'=C_3H_7 | 3 | 2 | 1 | 1 | 2 | 3 | 1 | 1 |

Example 4

Different plants were sown in seed dishes as in Example 2, and treated with an aqueous dispersion of the compound

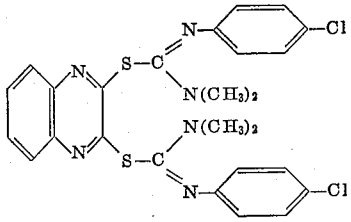

The following experimental findings were obtained 3 weeks later, at a rate of application of 40 kg./hectare:

| | |
|---|---|
| Millet | 4–5 |
| Beet | 5 |
| Oats | 4 |
| Cotton | 0 |
| Wheat | 3 |
| Mustard | 5 |

Evaluation scale: 0=normal plant development; 5= plants did not emerge or died after emergence.

We claim:
1. Method for controlling plant growth which comprises contacting said plant with a herbicidally effective amount of a 2,3-dimercapto-quinoxaline derivative of the formula

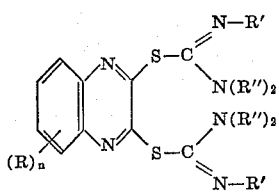

wherein
R stands for a member selected from the group consisting of hydrogen, alkyl of 1–4 carbon atoms, alkoxy of 1–4 carbon atoms, nitro, chloro and bromo;
n is an integer of 1–4;
R' is a member selected from the group consisting of phenyl, halogenophenyl, alkoxyphenyl containing 1–4 carbon atoms in the alkoxy group, and halogenoalkoxyphenyl containing 1–4 carbon atoms in the alkoxy group;
R" is a member selected from the group consisting of (1) an alkyl of 1–4 carbon atoms and (2) in combination with the nitrogen atom a heterocyclic ring selected from the group consisting of piperidyl and morpholyl.

2. Method of claim 1 which comprises applying to said plants an effective amount of a compound of the formula

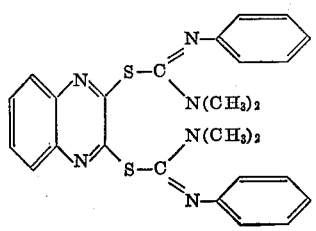

3. Method of claim 1 which comprises applying to said plants an effective amount of a compound of the formula

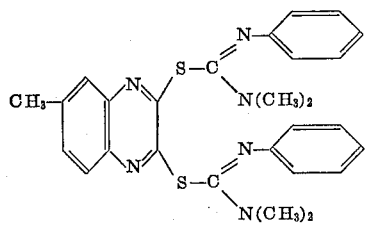

4. Method of claim 1 which comprises applying to said plants an effective amount of a compound of the formula

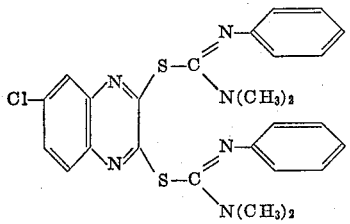

5. Method of claim 1 which comprises applying to said plants an effective amount of a compound of the formula

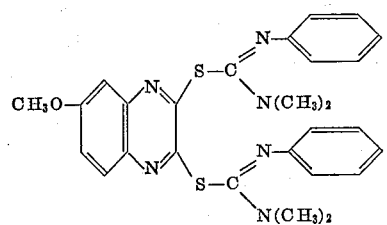

6. Method of claim 1 which comprises applying to said plants an effective amount of a compound of the formula

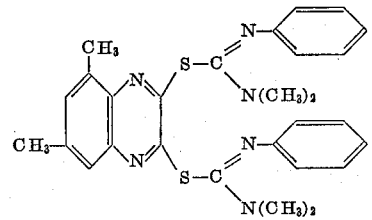

7. Method of claim 1 which comprises applying to said plants an effective amount of a compound of the formula

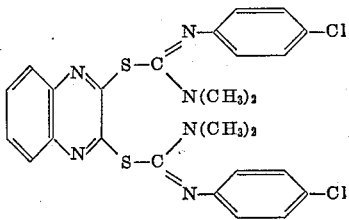

References Cited by the Examiner

UNITED STATES PATENTS 2,940,844   6/1960   Gysin et al. _____ 71—2.5

OTHER REFERENCES

Belgian Patent 612,972, July 23, 1962 (12 pp. spec.; no dwg.), abstracted in Chemical Abstracts, vol. 58, col. 1475(e) (1963), and Derwen's Belgian Patents Report No. 92A (1962).

LEWIS GOTTS, *Primary Examiner.*

JAMES O. THOMAS, *Assistant Examiner.*